US010877890B2

(12) United States Patent
Alameldeen et al.

(10) Patent No.: US 10,877,890 B2
(45) Date of Patent: Dec. 29, 2020

(54) PROVIDING DEAD-BLOCK PREDICTION FOR DETERMINING WHETHER TO CACHE DATA IN CACHE DEVICES

(71) Applicant: INTEL CORPORATION, Santa Clara, CA (US)

(72) Inventors: Alaa R. Alameldeen, Hillsboro, OR (US); Gino Chacon, Longview, TX (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/996,392

(22) Filed: Jun. 1, 2018

(65) Prior Publication Data
US 2019/0050332 A1 Feb. 14, 2019

(51) Int. Cl.
*G06F 12/084* (2016.01)
*G06F 12/0808* (2016.01)
(Continued)

(52) U.S. Cl.
CPC ........ *G06F 12/084* (2013.01); *G06F 12/0808* (2013.01); *G06F 12/0811* (2013.01); *G06F 12/0824* (2013.01); *G06F 12/0888* (2013.01); *G06F 12/0891* (2013.01); *G06F 12/128* (2013.01); *G06F 12/0813* (2013.01); *G06F 2212/1024* (2013.01);
(Continued)

(58) Field of Classification Search
None
See application file for complete search history.

(56) References Cited

U.S. PATENT DOCUMENTS

| 7,600,080 B1 * | 10/2009 | Bhattacharyya | .... G06F 12/0817 711/118 |
| 2015/0039833 A1 * | 2/2015 | Chang | .................. G06F 12/0848 711/129 |

(Continued)

FOREIGN PATENT DOCUMENTS

WO 2017/052734 3/2017

OTHER PUBLICATIONS

Handout 14/Lab 7: Multicore and Cache Coherence, CMU 18-447: Introduction to Computer Architecture, [online], Apr. 23, 2012, retrieved from the Internet at <URL: http://www.ece.cmu.edu/~ece447/>, 8 pp.

(Continued)

*Primary Examiner* — Charles Rones
*Assistant Examiner* — Jonah C Krieger
(74) *Attorney, Agent, or Firm* — Konrad Raynes Davda & Victor LLP; David W. Victor

(57) ABSTRACT

Provided are an apparatus and system to cache data in a first cache and a second cache that cache data from a shared memory in a local processor node, wherein the shared memory is accessible to at least one remote processor node. A cache controller writes a block to the second cache in response to determining that the block is more likely to be accessed by the local processor node than a remote processor node. The first cache controller writes the block to the shared memory in response to determining that the block is more likely to be accessed by the one of the at least one remote processor node than the local processor node without writing to the second cache.

20 Claims, 8 Drawing Sheets

(51) Int. Cl.
    *G06F 12/0817*    (2016.01)
    *G06F 12/128*     (2016.01)
    *G06F 12/0811*    (2016.01)
    *G06F 12/0888*    (2016.01)
    *G06F 12/0891*    (2016.01)
    *G06F 12/0813*    (2016.01)

(52) U.S. Cl.
    CPC .............. *G06F 2212/1032* (2013.01); *G06F 2212/1041* (2013.01); *G06F 2212/507* (2013.01); *G06F 2212/608* (2013.01)

(56) References Cited

U.S. PATENT DOCUMENTS

| | | | | |
|---|---|---|---|---|
| 2015/0378913 | A1* | 12/2015 | Jouppi | G06F 12/08 711/119 |
| 2015/0378925 | A1* | 12/2015 | Misra | G06F 12/0891 711/141 |
| 2017/0091093 | A1 | 3/2017 | Wang et al. | |
| 2018/0088953 | A1* | 3/2018 | Lin | G06F 9/30058 |
| 2019/0155750 | A1* | 5/2019 | Wang | G06F 12/0811 |

OTHER PUBLICATIONS

Huang, C. et al., "C3D: Mitigating the NUMA Bottleneck via Coherent DRAM Caches", in Proceedings of the 49th Annual IEEE/ACM International Symposium on Microarchitecture, Oct. 2016, 12 pp.

Khan, S., et al., "Sampling Dead Block Prediction for Last-Level Caches", in Proceedings of the 43rd Annual IEEE/ACM International Symposium on Microarchitecture, Dec. 2010, 12 pp.

Lebeck, A.R., et al., "Dynamic Self-Invalidation: Reducing Coherence Overhead in Shared-Memory Multiprocessors", in Proceedings of the 22nd annual international symposium on Computer architecture, Jun. 1995, 12 pp.

Mark Funk's Blog, "Near Memory", [online], [Retrieved on May 3, 2018], Retrieved from the Internet at URL: http://mrfunk.info/?page_id=181>, 5 pp.

Sim, J., et al., "A Mostly-Clean DRAM Cache for Effective Hit Speculation and Self-Balancing Dispatch", in Proceedings of the 2012 45th Annual IEEE/ACM International Symposium on Microarchitecture, Dec. 2012, 11 pp.

Wikipedia, "Non-Uniform Memory Access", [online], last edited May 14, 2018, [Retrieved on May 20, 2018], Retrieved from the Internet at <URL: https://en.wikipedia.org/wiki/Non-uniform_memory_access>, 3 pp.

\* cited by examiner

PROVIDING DEAD-BLOCK PREDICTION FOR DETERMINING WHETHER TO CACHE DATA IN CACHE DEVICES

TECHNICAL FIELD

Embodiments described herein generally relate to providing dead-block prediction for determining whether to cache data in cache devices.

BACKGROUND

In a non-uniform memory access (NUMA) system, different processing sockets in the system each include processing cores and private caches to cache data used by the local processing core and shared memory that is shared among all the processing sockets. In a NUMA system, a processor can access its own local memory faster than non-local memory (memory local to another processor or memory shared between processors). A NUMA system uses inter-processor communication to maintain cache coherence among the sockets. Maintaining cache coherence by coordinating access may result in latency delays for one socket to gain exclusive access or ownership of a block address that is stored in the private cache of another socket.

As the size of Direct Random Access Memory (DRAM) cache increases, allowing for larger private caches, cache coherence overhead increases due to tracking a large amount of blocks that are potentially cached within a socket. Large on-socket memory also increases the number of invalidation and read requests to the socket, mainly to the DRAM cache. Since these caches often have access latencies similar to accessing main memory, the benefit of removing a shared memory access is also lost as improvements to memory latency are offset by the delay in waiting for a remote invalidation.

There is a need in the art for implementing a cache coherence policy that reduces latency for requests from remote sockets in a system to access a block address stored in a private cache of another socket.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
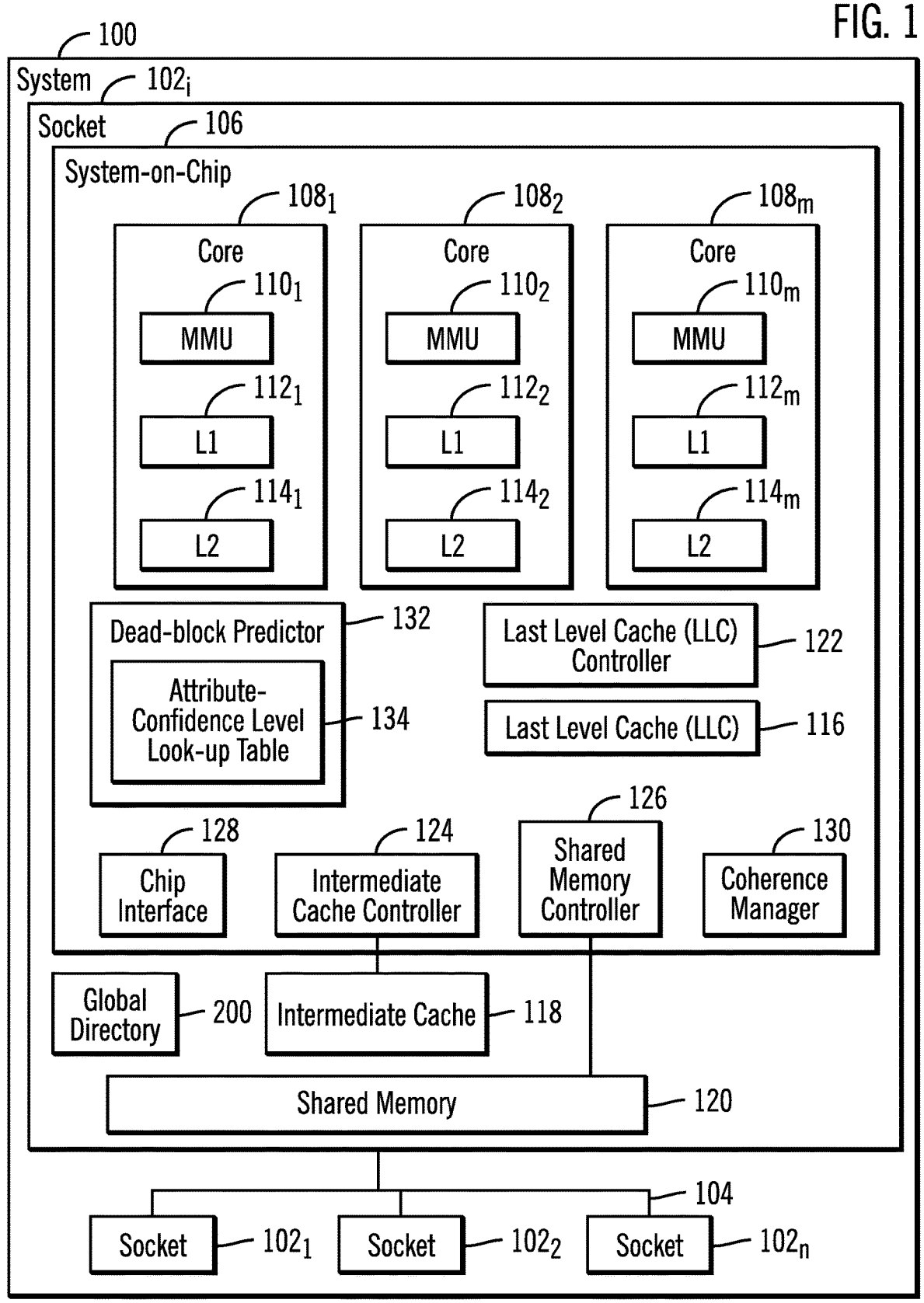
FIG. 1 illustrates a multi-socket system in which embodiments are implemented.

To reduce latency delays experienced by a remote socket seeking exclusive access to a block address that is stored in a cache of another socket in a multi-socket system, prior art NUMA solutions may prevent the private DRAM caches of a socket from storing dirty data to preclude the need to track dirty data in the global directory. By not having dirty data in the DRAM cache, reads and invalidations are reduced but hits are reduced because sockets cannot use local private cache to store dirty data.

Described embodiments improve the computer technology for caching dirty data in a multi-socket processing system by reducing latency for local accesses as well as read-for-ownership requests from remote sockets by deploying a dead-block predictor in each socket to determine whether to cache dirty data in the private caches that is predicted to be a dead-block, i.e., data that will likely sooner be requested by a remote socket than used in the local socket. Described embodiments use dead-block prediction to determine if a dirty block, on eviction from the last level cache, should be written to an intermediate cache, such as a DRAM cache, or written through to shared memory. In this way, latency to grant a remote socket exclusive access to a block address is reduced because those block addresses likely to be in a producer-consumer relationship, i.e., likely to be requested by another socket as soon as written, are not stored in a private cache of a socket and thus do not need to be invalidated in the local private caches, reducing latency for remote ownership requests. However, data that is not determined to be in a producer-consumer relationship and likely to be frequently requested in the local socket is stored in a local private cache to reduce the latency of read misses in the local socket, where requested data can be returned from a local private cache.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a system 100 including a plurality of central processing unit (CPU) sockets $102_1$, $102_2$, $102_i$ ... $102_n$, that communicate over a bus 104. Socket $102_i$ shows the components included in all the sockets $102_1$ ... $102_n$, and includes a system-on-a-chip 106 having a plurality of processing cores $108_1$, $108_2$ ... $108_m$, each having a memory management unit (MMU) $110_1$, $110_2$ ... $110_m$, an on-chip L1 cache $112_1$, $112_2$ ... $112_m$ and on-chip L2 cache $114_1$, $114_2$ ... $114_m$ that are private to the processing cores $106_1$, $106_2$ ... $106_m$, and not accessible to other sockets $102_1$ ... $102_n$. Each socket $102_1$ further includes additional caches private to the socket $102_i$, including a last level cache (LLC) 116 providing a larger storage space to cache data for the L1 and L2 caches and an intermediate cache 118 to cache data for the last level cache 116. The socket $102_i$ further maintains a shared memory 120 storing data in a shared state accessible to all the sockets $102_1$, $102_2$ ... $102_n$. The last level cache 116 and intermediate cache 118 may further be referenced as a third level cache (L3) and fourth level cache (L4), respectively. Still further, the last level cache 116 may be referred to as a first cache, i.e., first cache from the core L1 and L2 caches, and the intermediate cache 118 referred to as a second cache, comprising a lower level in the hierarchy from the last level (first) cache 116.

The intermediate cache 118 provides a larger storage space than the LLC 116 to cache data for the LLC 116 from the shared memory 120, where the shared memory 120 may comprise a larger storage space than the intermediate cache 118. In one embodiment, shared memory 120 may be split into slices across all sockets $102_1$ ... $102_n$. In another embodiment, shared memory 120 may be a unified structure that is shared among all sockets $102_1$ ... $102_n$. The intermediate cache 118 and the shared memory 120 may comprise Dynamic Random Access Memory (DRAM) devices. Each socket $102_1$ includes a last level cache (LLC) controller 122 to manage read and write requests to the last level cache 116, an intermediate cache controller 124 to manage read and write requests to the intermediate cache 118, and a shared memory controller 126 to manage read and write requests to the shared memory 120. A chip interface 128 enables communication with other of the sockets $102_1$ ... $102_n$ on the bus 104 or socket interface.

The processing cores $108_1$, $108_2$ ... $108_m$ may write-back modified cache lines from the L2 cache $114_1$, $114_2$ ... $114_m$ to the shared last level cache (LLC) 116, shared among the cores $108_1$, $108_2$ ... $108_m$, to make room for a cache line evicted from the L1 cache $112_1$, $112_2$ ... $112_m$. When modified data needs to be removed from the L2 cache $114_1$, $114_2$ ... $114_m$ to make room for modified data from the L1 cache $112_1$, $112_2$ ... $112_m$ a write-back operation is performed to write the data to the last level cache 116. When modified data needs to be removed from the last level cache 116 to make room for new modified data from the L2 cache $114_1$, $114_2$ ... $114_m$, a write-back writes the data evicted from the last level cache 116 to the intermediate cache 118, and when data needs to be evicted from the intermediate cache 118 to make room for new modified data from the last level cache 116, it is written to the shared memory 120. This intermediate cache 118 may comprise a private DRAM cache for the LLC 116 evictions to reduce off-socket traffic. In this way the L1 cache $112_1$, $112_2$ ... $112_m$, L2 cache $114_1$, $114_2$ ... $114_m$, last level cache 116, intermediate cache 118, and shared memory 120 provide a memory hierarchy.

The L1 cache $112_1$, $112_2$ ... $112_m$, L2 cache $114_1$, $114_2$ ... $114_m$, last level cache 116, and intermediate cache 118 may comprise private caches storing data used by processing cores $110_1$, $110_2$ ... $110_n$ so the socket $102_1$ does not have to retrieve data from a remote socket $102_j$, which would have more latency to access, or an off-socket access. Data in the shared memory 120 is accessible to all the sockets $102_1$ ... $102_n$. Further, the intermediate cache 118 may be considered a near memory cache to the last level cache 116 and the shared memory 120 may be considered a far memory cache to the last level cache 116.

The processing cores $108_1$, $108_2$ ... $108_m$ may each include additional components such as a system agent, bus interface controllers, graphics, translation lookaside buffer (TLB), etc. Further, there may only be one cache on a processing core $108_i$, where a processing core $108_i$ comprises any one of the processing cores $108_1$, $108_2$ ... $108_m$.

In certain embodiments, the system 100 and sockets may implement a non-uniform memory access (NUMA) design. In alternative embodiments, the system may be implemented with different designs.

In FIG. 1, the last level cache 116 is shown in the system-on-a-chip 102. In alternative embodiments, the last level cache 116 may be on the system 100 motherboard external to the system-on-a-chip 106.

In one embodiment, the L1 cache $112_1$, $112_2$ ... $112_m$ and L2 cache $114_1$, $114_2$ ... $114_m$ are implemented on the processing cores $108_1$, $108_2$ ... $108_m$. The last level cache (LLC) 116 may comprise a non-volatile memory device, such as a spin-transfer torque magnetic random-access memory (STT-RAM), which has the characteristic of high read performance and low read energy consumption, but has a higher write energy and longer write latency. The intermediate cache 118 and shared memory 120 may comprise Dynamic Random Access Memory (DRAM), etc. Other non-volatile and volatile memory devices may be used for the memories 116, 118, and 120, including, but not limited to, a three dimensional crosspoint (3D crosspoint) memory device, memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory, or storage, such as magnetic storage medium, etc. hard disk drives, tape, etc. The memory device may refer to the die itself and/or to a packaged memory product.

FIG. 1 shows a multi-core implementation. In an alternative embodiment, the last level cache 116 may be provided for just a single core processor having an L1 and L2 cache. The number of cores may comprise any number of one or more cores implemented on the system-on-a-chip 102. The system-on-a-chip 102 may comprise an Intel® Core® microarchitecture or multi-core processor microarchitecture from other vendors and manufacturers. (Intel and Core are trademarks of Intel Corporation throughout the world).

Each socket $102_i$ has a coherence manager 130 to manage access to a global directory 200 that has information on each block address managed by the sockets $102_1 \ldots 102_n$. Each socket may have a slice or portion of the global directory 200 for those block addresses managed by the socket $102k$. The assignment of blocks to sockets $102_1 \ldots 102_n$ is static so that the coherence manager 130 in each socket $102_i$ knows which socket $102_1 \ldots 102_n$ has information for a block address in its global directory 200. Thus, if a socket $102_i$ needs to access a block address whose information is maintained on another socket $102_j$, then the coherence manager 130 of socket $102_i$ needs to send a request to the global directory 200 on another socket to coordinate access, such as determine whether the block address is available or being accessed by another socket.

Figure 2:
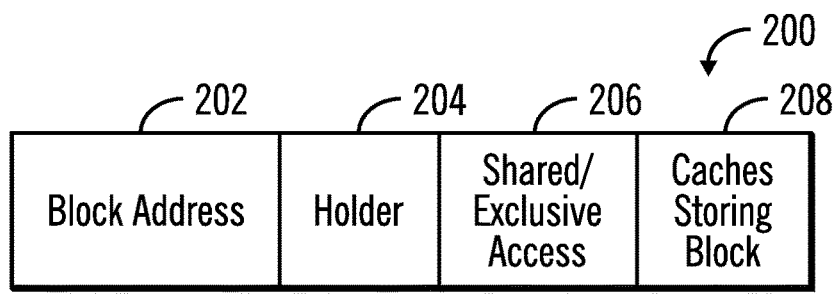
FIG. 2 illustrates an embodiment of an entry in a global directory used for cache coherence.

FIG. 2 is an embodiment of a global directory entry $200_i$ in a global directory 200 of the socket $102_i$ including a block address 202 that is shared among the sockets $102_1 \ldots 102_n$; a holder 204 comprising a socket $102_i$ that currently has exclusive access to the block 202 or multiple sockets having shared access to the block 202; a shared/exclusive flag 206 indicating whether access to the block address is held shared or exclusive; and caches storing the block 208 indicating caches in which a copy of the block is stored in the one or more holders 204, such as LLC 116, intermediate 118, shared memory 120

When a remote socket 102S wants exclusive access to a block address that is currently stored in a private cache of the socket $102_i$, it will have to send requests to invalidate copies of that block in private caches in the socket $102_i$, so that the only copy comprises a copy maintained in the L1 cache $112_1 \ldots 112_n$, L2 cache $114_1 \ldots 114_n$, Last Level Cache 116 and/or intermediate cache 118 of the remote socket 102S that requested exclusive access. In this way, the invalidation request means that the only (and latest) copy of the block in the system is in one of the caches (L1/L2/L3/L4) of the socket 102S that requested exclusive access to the block.

In described embodiments, a socket $102_i$ will seek to avoid storing in private caches block addresses that are likely to be accessed by other of the sockets to reduce latency experienced by a remote socket $102_R$ in having to invalidate the block address in private caches. Each socket may maintain a dead block predictor technique that predicts if a dirty block in a cache, such as the last level cache 116, should be stored in the next level cache, i.e., the intermediate cache 118 or bypass the next level private cache to write the data directly to the shared memory 120. If a block is likely to be written by a socket $102_i$ in the future or is unlikely to be requested by another socket, then maintaining that block address in a private cache reduces latency in cache misses at the local socket. If a block is likely to be accessed by a remote socket, such as in a producer-consumer relationship, or is written to infrequently while in the private cache, then the data can bypass the private caches so a remote socket does not experience latency in invalidating the block address in the private caches and writing the data to the shared memory 120.

In one embodiment, the system 100 includes a dead-block predictor 132 to determine whether data being evicted from the last level cache 116 should be cached in the intermediate cache 118 to be available for on-chip requests in the socket $102_i$ or the intermediate cache 118 should be bypassed and the data directly written to the shared memory 120, if the data is likely to soon be requested by a remote socket $102_R$, such as data in a producer-consumer relationship.

The dead-block predictor 132 may comprise a component or integrated circuit device external to the last level cache controller 122 or may be implemented within the logic of the last level cache controller 122. The dead-block predictor 132 considers attributes and features related to the block address being evicted from the last level cache 116 to make decisions on which type of write policy to use, bypass the intermediate cache 118 and write directly to the shared memory 120 or write to the intermediate cache 118. The dead-block predictor 132 includes an attribute confidence level look-up table 134 that includes attributes of the block address being evicted from the last level cache 116, such as the partial physical address of the block, the cycle the block was evicted at, or any other information related to the block, and associates the attribute with a confidence level the attribute indicates the block address will be soon accessed by a remote socket $102_R$, such as data in a producer-consumer relationship. In one embodiment, if the confidence level satisfies a high threshold, then it is considered to be likely to be soon accessed by a remote socket $102_R$, i.e., in a producer-consumer relationship, whereas a confidence level less than the threshold indicates the data is more likely to be accessed exclusively on-chip in the socket $102_i$ in which it is stored.

Figure 3:
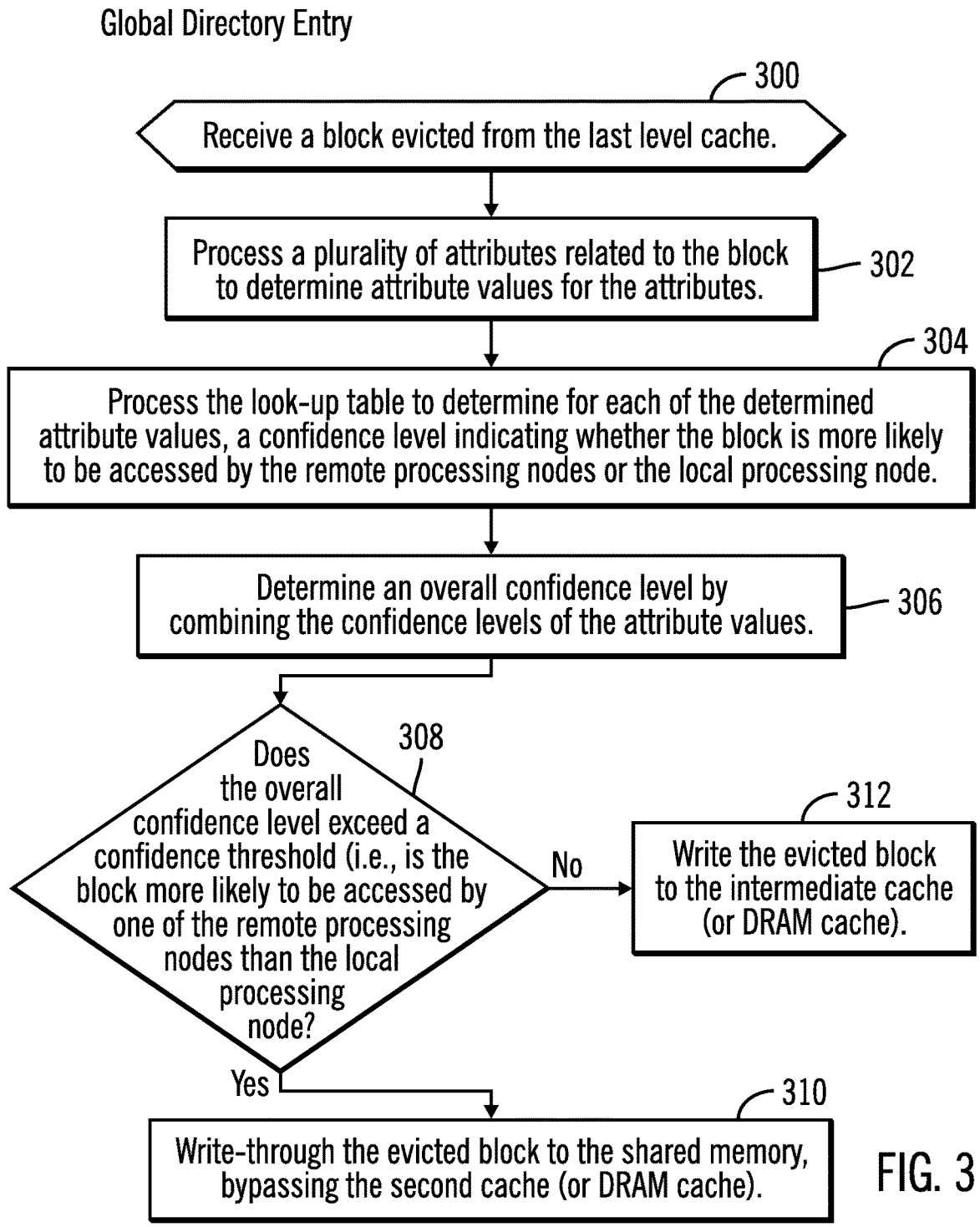
FIG. 3 illustrates an embodiment of operations to use dead-block prediction to determine whether to cache data evicted from a last level cache to an intermediate cache in one of the sockets.

FIG. 3 illustrates an embodiment of operations performed by the dead-block predictor 132 to determine whether to store a block being evicted from the last level cache 116 in the intermediate cache 118 or bypass the intermediate cache 118 and store in the shared memory 120. Upon receiving (at block 300) a block evicted from the last level cache 116, the dead-block predictor 132 processes (at block 302) a plurality of attributes related to the block to determine attribute values. The dead-block predictor 132 processes (at block 304) the look-up table 134 to determine, for each of the determined attribute values, a confidence level indicating whether the block is more likely to be accessed by one of the remote processing nodes 102S or the local processing node. An overall confidence level is determined (at block 306) by combining the confidence levels of the attribute values. If (at block 308) the overall confidence level exceeds a confidence threshold (i.e., is the block more likely to be accessed soon by one of the remote processing nodes than the local processing node), the dead-block predictor 132 performs (at block 310) a write-through of the evicted block to the shared memory 120, bypassing the intermediate cache (or DRAM cache). If (at block 308) the overall confidence level indicates the block is likely to be more frequently accessed in the local socket, then the evicted block is written (at block 312) to the intermediate cache 118 to be available for local access.

With the embodiment of FIGS. 1-3, the dead-block write predictor 132 uses past behaviors of similar data with respect to being accessed by remote sockets or not to make decisions about the relationship of the data being evicted from the last level cache 116 to other sockets $102_1 \ldots 102_n$, and the local socket. If a block is found to be in a producer-consumer relationship, it is more beneficial to write the data through and permit it to be shared, reducing the latency in waiting for the data to invalidate in the intermediate cache 118, move to the shared memory 120, and update the global directory $200_i$ entry for the block to indicate the shared state and new cache locations for the block. This allows a remote socket $102_R$ to make more aggressive decisions about whether to access the producing socket or shared memory, depending on the available local bandwidth within the socket. If the data is likely to be immediately requested by another socket, such as in a producer-consumer relationship, then a write-through protocol is enacted to permit other sockets to read the data from shared memory 120 or the owner socket. Further, performing the write-through leaves more space available in the intermediate cache 118 for those block addresses the local socket is likely to frequently access, thus reducing latency for these local accesses to the data.

Multi-socket workloads also often display bias to writing or reading to certain addresses that are not requested by remote sockets to own. This data does not benefit from a write-through policy as remote sockets are unlikely to request the data. In this case, keeping data within the intermediate cache 118 (e.g., DRAM cache) prevents the socket from going through the act of sending an invalidation request to another socket and retrieving the clean data from either a remote socket or main memory. The data stays local and benefits from any distant temporal locality present in the workload. This relationship is represented as the dead-block predictor viewing the address and similarly accessed locations as exclusive to the owner socket.

Figure 4:
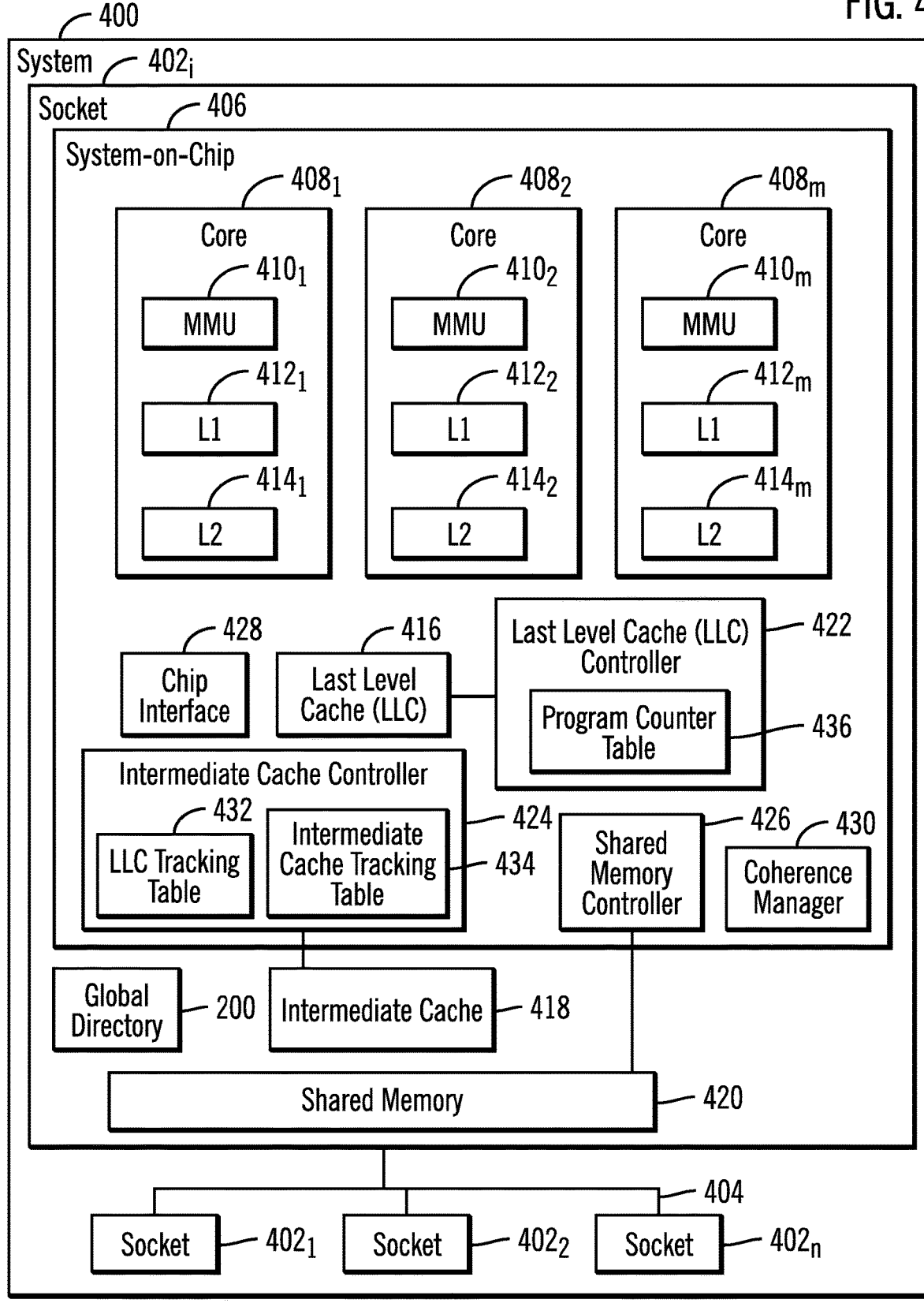
FIG. 4 illustrates an additional embodiment of a multi-socket system in which embodiments are implemented.

FIG. 4 illustrates an additional embodiment of a system 400 including many of the same components as in the system 100 in FIG. 1. Components 200, $402_1$, $402_2$, $402_i$ ... $402_n$, 404, 406, $408_1$, $408_2$ ... $408_m$, $410_1$, $410_2$ ... $410_m$, $412_1$, $412_2$ ... $412_m$, $414_1$, $414_2$ ... $414_m$, 416, 418, 420, 422, 424, 426, 428, and 430 in FIG. 4 are the same as those described with respect to components 200, $102_1$, $102_2$, $102_i$ ... $102_n$, 104, 106, $108_1$, $108_2$ ... $108_m$, $110_1$, $110_2$ ... $110_m$, $112_1$, $112_2$ ... $112_m$, $114_1$, $114_2$ ... $114_m$, 116, 118, 120, 122, 121, 126, 128, and 130 in FIG. 1, respectively. One difference is that the intermediate cache controller 424 of FIG. 4 includes a last level cache (LLC) tracking table 432 to track modified (dirty) block addresses invalidated in the last level cache 416 and an intermediate cache tracking table 434 to track modified (dirty) block addresses invalidated in the intermediate cache 418. Another difference with the system 100 of FIG. 1 is that the last level cache controller 422 may include a program counter table 436 to track program counters of instructions requesting a block address that was invalidated in the intermediate cache 418.

The tracking tables 432, 434, 436 may be implemented as a list of a fixed or limited number of invalidated addresses, where Least Recently Used (LRU) replacement is used to remove a block address from the table 432, 434, 436 at the LRU end to make room to add a new block address invalidated to the most recently used (MRU) end of the table 432, 434, 436. In certain embodiments, the intermediate cache tracking table 434 is larger and will track more invalidated addresses than the LLC tracking table 432 because the intermediate cache tracking table 434 is tracking addresses invalidated in the intermediate cache 418, which is larger than the last level cache 416, and the LLC tracking table 432 tracking invalidated dirty addresses in the smaller last level cache 416. The program counter table 436 may further comprise a limited size table 436 in the last level cache controller 422 and may further be of limited size, smaller than the LLC tracking table 432. The tables 432, 434 may be stored in the intermediate cache controller 424 or the intermediate cache 418. In alternative embodiments, the tables 432, 434, 436 may be stored in other locations.

As discussed, in one embodiment, the tables 432, 434, and 436 may be implemented as fixed size lists. In an alternative embodiment, the tables 432, 434, and 436 may be implemented as bloom filters. In bloom filter embodiments that keep track at a course granularity of the last few invalidated addresses and program counters, a bloom filter hit indicates that the checked address or program counter has recently been invalidated. Although a false positive results in incorrect dead block predictions, this has a minor impact on performance since it would result in a few additional DRAM cache misses. The bloom filter may be periodically reset to avoid the accumulation of stale data which could significantly increase false positives.

The tables 432, 434 may be used as dead-block predictors because block address in the tables 432, 434 indicate recently invalidated addresses/program counters that are likely to comprise blocks frequently accessed by remote sockets $402_R$, or likely to be in a producer-consumer relationship. Such blocks indicated in the tables 432, 434 should not be cached in the last level cache 416 or intermediate cache 418 to avoid latency delays by the remote socket $402_R$ having to invalidate the block addresses in the caches 416, 418. The program counter table 436 indicates program instructions that requested a block address recently invalidated in intermediate cache 418 by a remote socket $402_R$ accessing the data, and that would be predicted to likely request further addresses that would be soon invalidated by a remote socket $402_R$.

Figure 5:
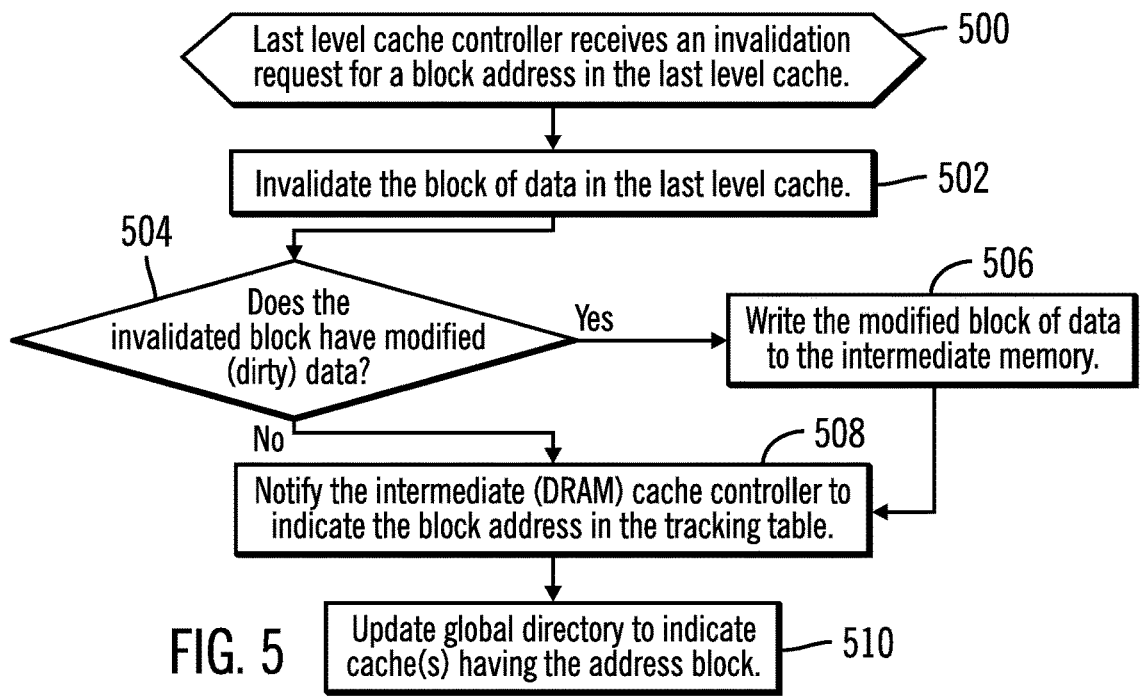
FIG. 5 illustrates an embodiment of operations to process an invalidation request for a block address in a last level cache.

FIG. 5 illustrates an embodiment of operations performed in the last level cache controller 422 to process a request to invalidate a block address in the last level cache 416 from a remote socket $402_R$ seeking access to the block address. In response (at block 500) to the invalidation request for the block address, the last level cache controller 422 invalidates (at block 502) the block of data in the last level cache 416. If (at block 504) the invalidated block has modified or dirty data, then the last level controller 422 writes the modified block of data to the intermediate cache 418. After writing the modified block (from block 506) or if the invalidated block does not have modified data, the last level cache controller 422 notifies (at block 508) the intermediate cache controller 424 to indicate the invalidated block address in the LLC tracking table 432. The global directory 200 having the entry 300, for the invalidated block may then be updated (at block 510) to indicate in entry 208 of the global directory 200 the caches now having a copy of the block address that has been invalidated in the private cache 416 or 418.

With the embodiment of FIG. 5, a track being invalidated in the last level cache 416 is now tracked in the last level cache tracking table 432, because given that track was just invalidated, it is also likely to soon be subject to a read-for-ownership request by a remote socket $402_R$ and invalidated. This allows this block address to now be tracked as a dead-block predictor for future accesses to the track to optimize subsequent decisions to cache the track in the intermediate cache 418.

Figure 6:
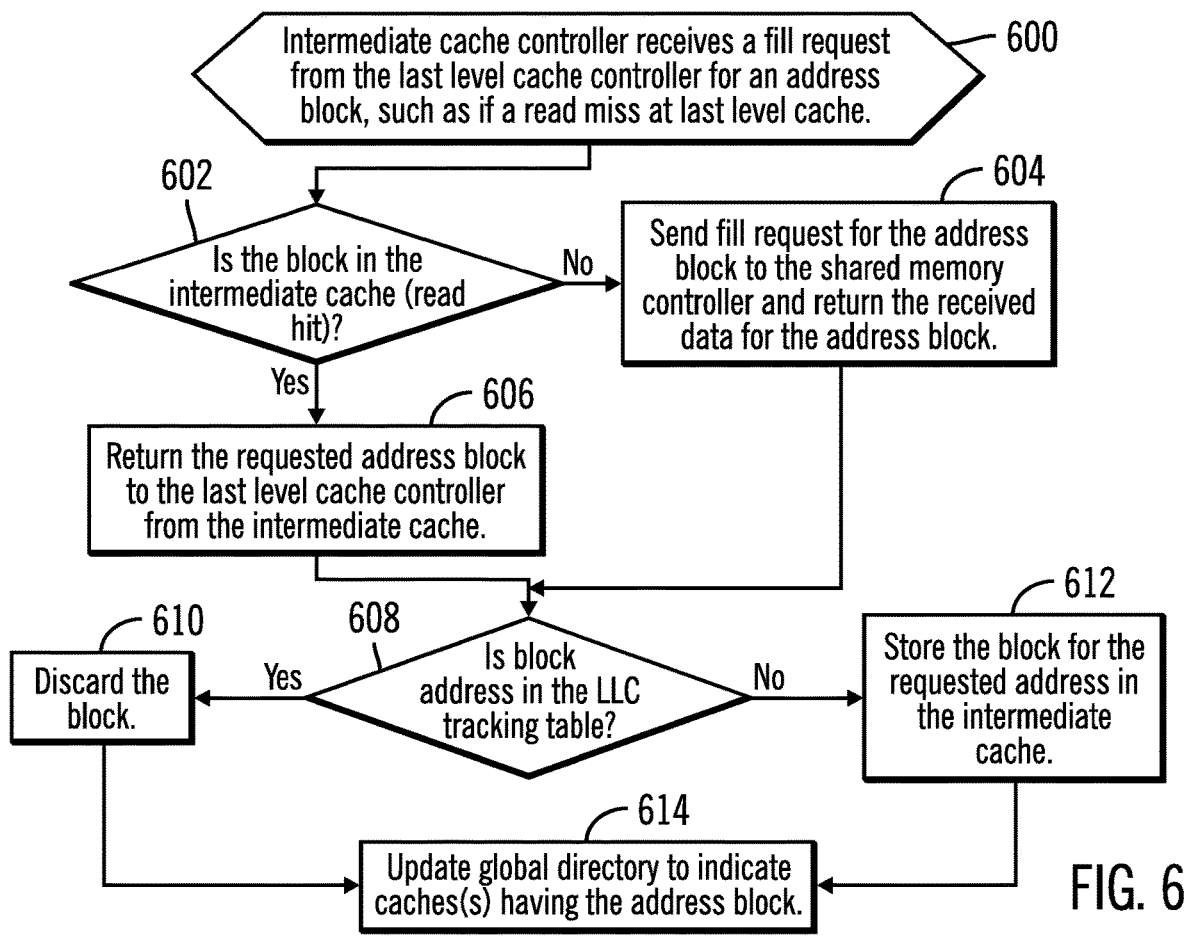
FIG. 6 illustrates an embodiment of operations to process a fill request at an intermediate cache from a last level cache.

FIG. 6 illustrates an embodiment of operations performed by the intermediate cache controller 424 to process a fill request from the last level cache controller 422 for an address block, such as if there is a read miss at the last level cache 416 for a block address requested by the memory management unit (MMU) $410_i$ by a core $408_i$. Upon receiving a fill request (at block 600), the intermediate cache controller 424 determines (at block 602) whether the requested block is in the intermediate cache 418, e.g., a cache hit. If not, the intermediate cache controller 424 sends (at block 604) a fill request for the requested address block to the shared memory controller 426 and returns the received data for the address block to the last level cache controller 422. If (at block 602) the requested block is in the intermediate cache 418, then the requested address block is returned (at block 606) from the intermediate cache 418 to the last level cache controller 422. From block 604 or 606, if (at block 608) the requested block address is indicated in the LLC tracking table 432, then the block address is likely dead in the intermediate cache 418, likely to be invalidated as part of a read-for-ownership request by a remote socket $402_R$ seeking to have exclusive access to the block address. In such case, the block is discarded or not stored (at block 610) in the intermediate cache 418. From the no branch of block 608, the block for the requested address is stored (at block 612) in the intermediate cache 418 because the absence of the requested address in the LLC tracking table 432 indicates the block address is unlikely to be subject to an immediate invalidation request from a remote socket $402_R$, and more likely to be frequently requested locally. After discarding the block (from block 610) or storing the block (at block 612), the global directory 200 having the entry $200_i$ for the evicted block may then be updated (at block 614) to indicate the caches 208 now having a copy of the block address.

With the embodiment of FIG. 6, the LLC tracking table 432 is used to reduce latency for future read-for-ownership requests by avoiding caching in the intermediate cache 418 blocks returned to the last level cache 416 that are likely dead-blocks, likely subject soon to an invalidation request to provide ownership to a remote socket $402_R$. In this way, the embodiment of FIG. 6 reduces latency for cache coherence operations in the system 400.

Figure 7:
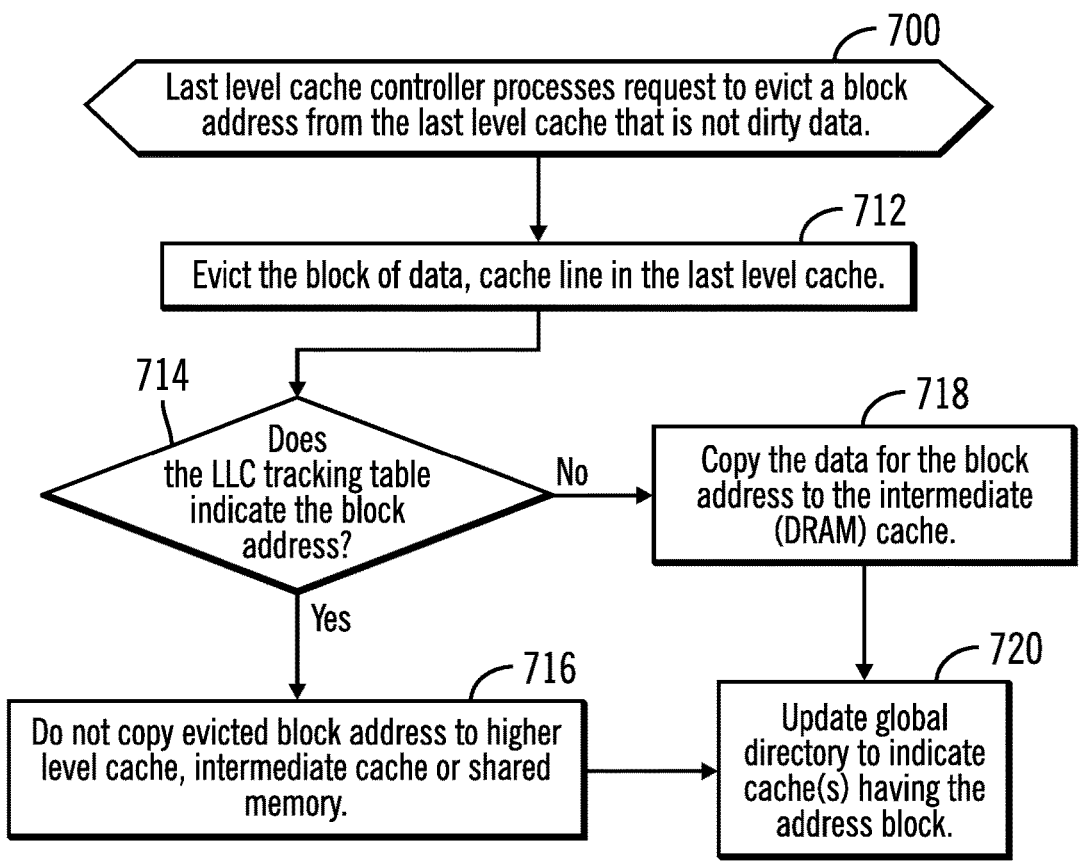
FIG. 7 illustrates an embodiment of operations to evict a block address from the last level cache.

FIG. 7 illustrates an embodiment of operations performed by the last level cache controller 422 to process an operation to evict a block from the last level cache 416 that is not modified (dirty) data, such as to make room for a new block address to cache in the last level cache 416. Upon processing (at block 700) a request to evict a block address from the last level cache 416 that is not dirty data, the block of data is evicted (at block 712) in the last level cache 416. If (at block 714) the LLC tracking table 432 indicates the block address to evict, then the block address is likely to be a dead-block, and the evicted block is not copied to a higher level cache, such as the intermediate cache 418. If (at block 714) the block address is not indicated in the LLC tracking table 432, then it is copied to the intermediate cache 418. After discarding the evicted block (from block 716) or caching the evicted block (at block 718), the global directory 200 having the entry $200_i$ for the evicted block may then be updated (at block 720) to indicate the cache 208 now having a copy of the evicted block. In certain embodiments, the last level cache controller 422 may determine whether a block address is in the LLC tracking table 432 by sending a request to the intermediate cache controller 424 to determine whether the address is in the LLC tracking table 432, and return the result of that query to the last level cache controller 422.

With the embodiment of FIG. 7, the LLC tracking table 432 is used to reduce latency for read-for-ownership requests by remote sockets by not caching a block evicted from the last level cache 416 in a higher level cache 418 that is likely to be requested by a remote socket as indicated by its presence in the LLC tracking table 432. Deciding not to cache an evicted block will avoid latency delays for the remote socket to have to invalidate the block that is cached in the cache 416 to take ownership. Further, because the block address is likely a dead-block, it will likely not be subject to frequent local requests, so not caching will not likely have much latency impact on local processing requests.

Figure 8:
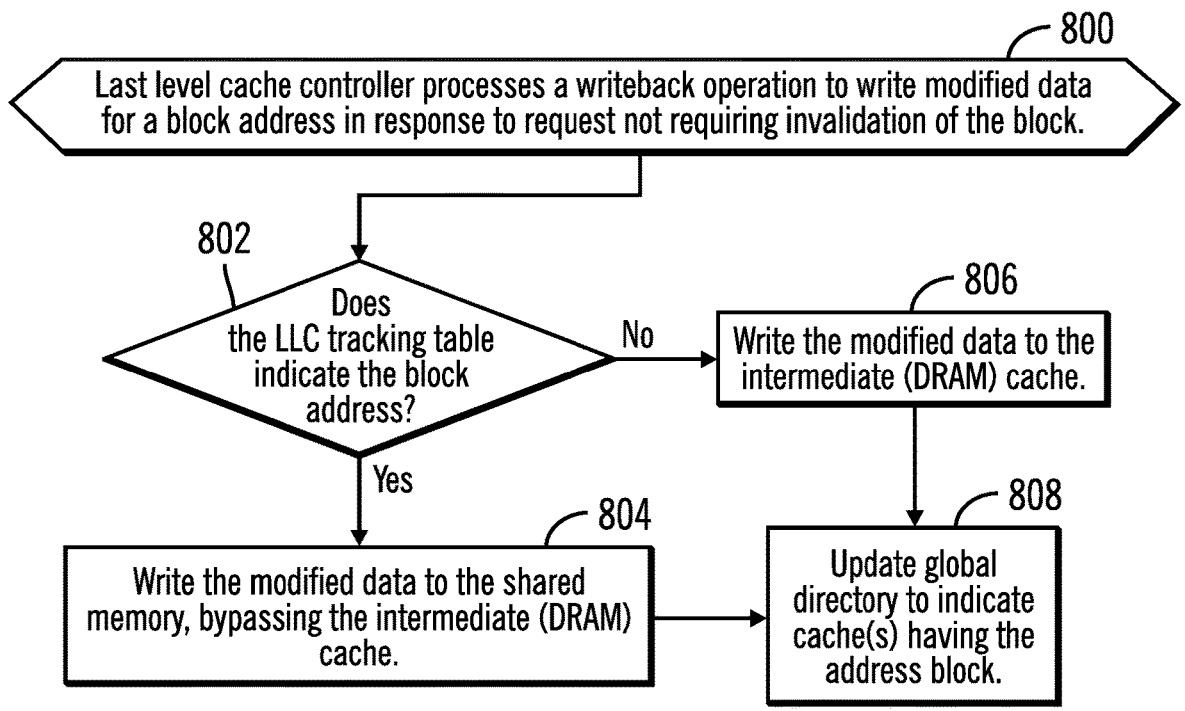
FIG. 8 illustrates an embodiment of operations to process a write-back operation at the last level cache.

FIG. 8 illustrates an embodiment of operations for the last level cache controller 422 to perform a write-back of a modified block address in the last level cache 416 in response to a request other than a request to invalidate the block address for a read-for-ownership request from a remote socket $402_R$, which is described with respect to FIG. 5. A write-back that does not require invalidation of the block address could be triggered by an eviction of a modified block address from the last level cache 416 to make room for newer data in the last level cache 416 or by a read request from a different socket $402_R$ core, in which case the block address may be locally cached and its status changed to shared. Upon processing (at block 800) a write-back of modified data, if (at block 802) the LLC tracking table 432 indicates the block address, then the block address is a dead-block, and the modified data is written (at block 804) to the shared memory 420, bypassing the intermediate cache 418 to be available as shared data for other requests. If (at block 802) the block address is not in the LLC tracking table 432, then the modified data is written (at block 806) to the intermediate cache 418. From block 804 or 806, the global directory 200 having the entry $200_i$ for the block address subject to the write-back may then be updated (at block 808) to indicate the caches 208 now having a copy of the block addresses $402_i$.

Figure 9:
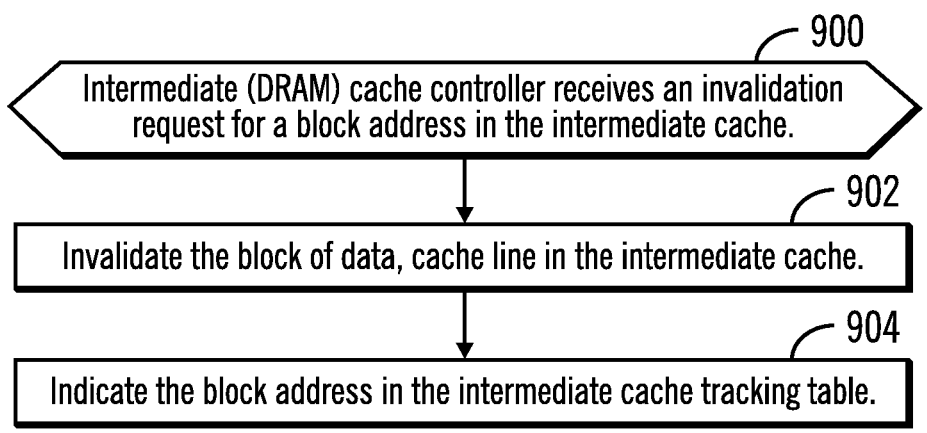
FIG. 9 illustrates an embodiment of operations to process an invalidation request at the intermediate cache.

FIG. 9 illustrates an embodiment of operations performed by the intermediate cache controller 424 to process an invalidation request for a block address in the intermediate cache 118 from a remote socket $402_R$ seeking exclusive access to the block address. Upon receiving (at block 900) the invalidation request, the intermediate cache controller 424 invalidates (at block 902) the block of data, i.e., cache line, in the intermediate cache 418 and indicates (at block 904) the block address in the intermediate cache tracking table 434, which indicates for future processing that the block is a dead-block and likely to soon be subject to a read-for-ownership request from a remote socket $402_R$.

Figure 10:
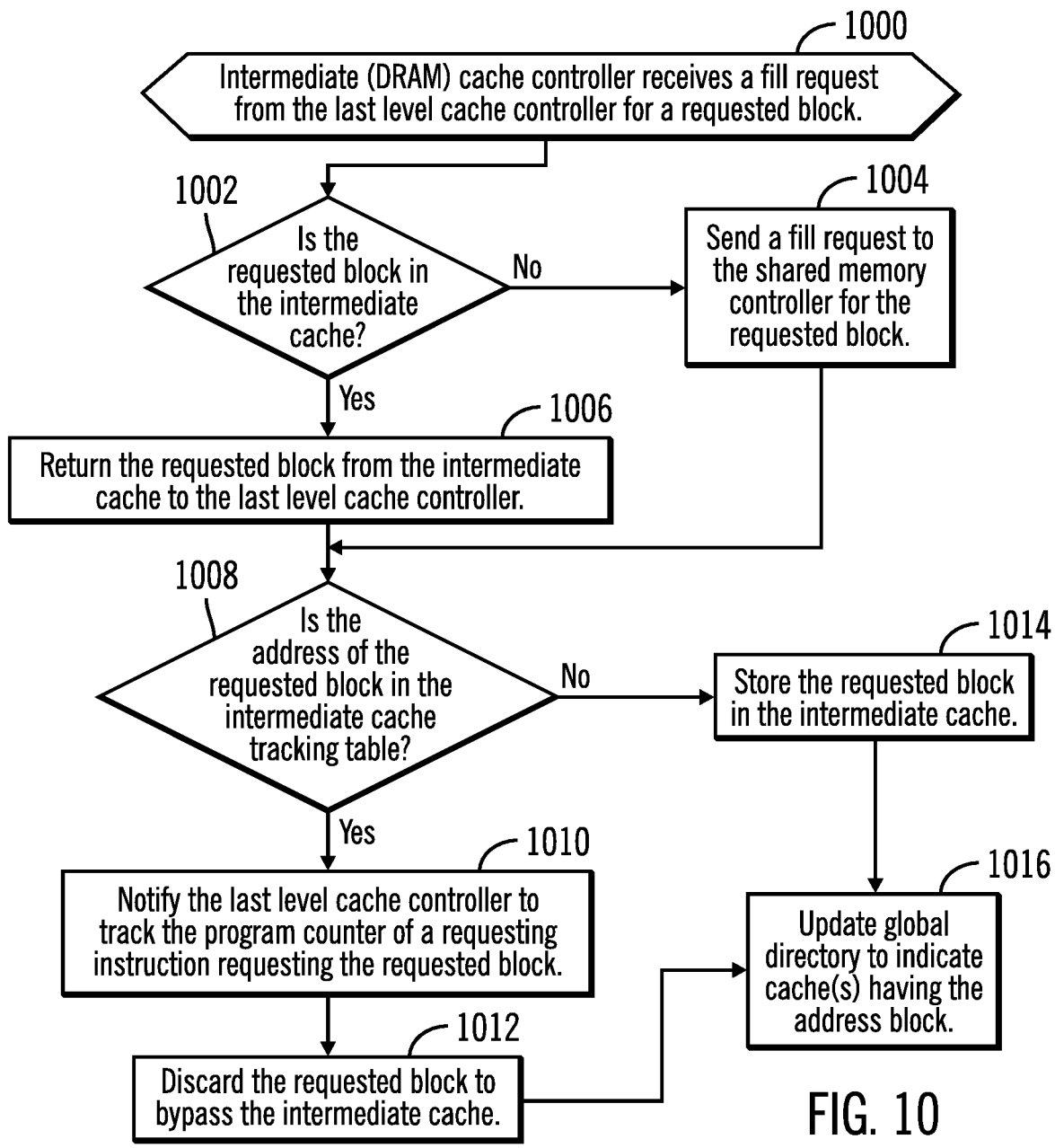
FIG. 10 illustrates an embodiment of operations to process a fill request from the last level cache at the intermediate cache.

FIG. 10 illustrates an embodiment of operations performed by the intermediate cache controller 424 to process a fill request from the last level controller 422, such as requested if there is a read miss to the last level cache 416. Upon receiving (at block 1000) the fill request, if (at block 1002) the requested block address is not in the intermediate cache 418, then the intermediate cache controller 424 sends (at block 1004) a fill request to the shared memory controller 426 for the requested block. If (at block 1002) the requested block address is in the intermediate cache 418, then the intermediate cache controller 424 returns (at block 1006) the block for the requested address from the intermediate cache 418 to the last level cache controller 422. If (at block 1008) the address of the requested block is in the intermediate cache tracking table 434, then the intermediate cache controller 424 notifies (at block 1010) the last level cache controller 422 to track the program counter of a requesting instruction that requested the requested block address causing it to be stored in the intermediate cache 118, since that requesting instruction may be part of a producer-consumer sharing program. The intermediate cache controller 424 discards (at block 1012) the requested block to not store in the intermediate cache 418 so that the intermediate cache 418 is bypassed. If (at block 1008) the requested address is not indicated in the intermediate cache tracking table 434, then the requested block is stored in the intermediate cache 418. From block 1012 or 1014, the global directory 200 having the entry $200_i$ for the requested block address to invalidate may then be updated (at block 1016) to indicate the caches 208 now having a copy of the block addresses.

With the embodiments of operations of FIGS. 9 and 10, the intermediate cache controller 424 uses the intermediate cache tracking table 434 to determine whether to keep data cached in the intermediate cache 418 based on whether the block is likely to be a dead-block subject to a read-for-ownership request from a remote socket $402_R$.

Figure 11:
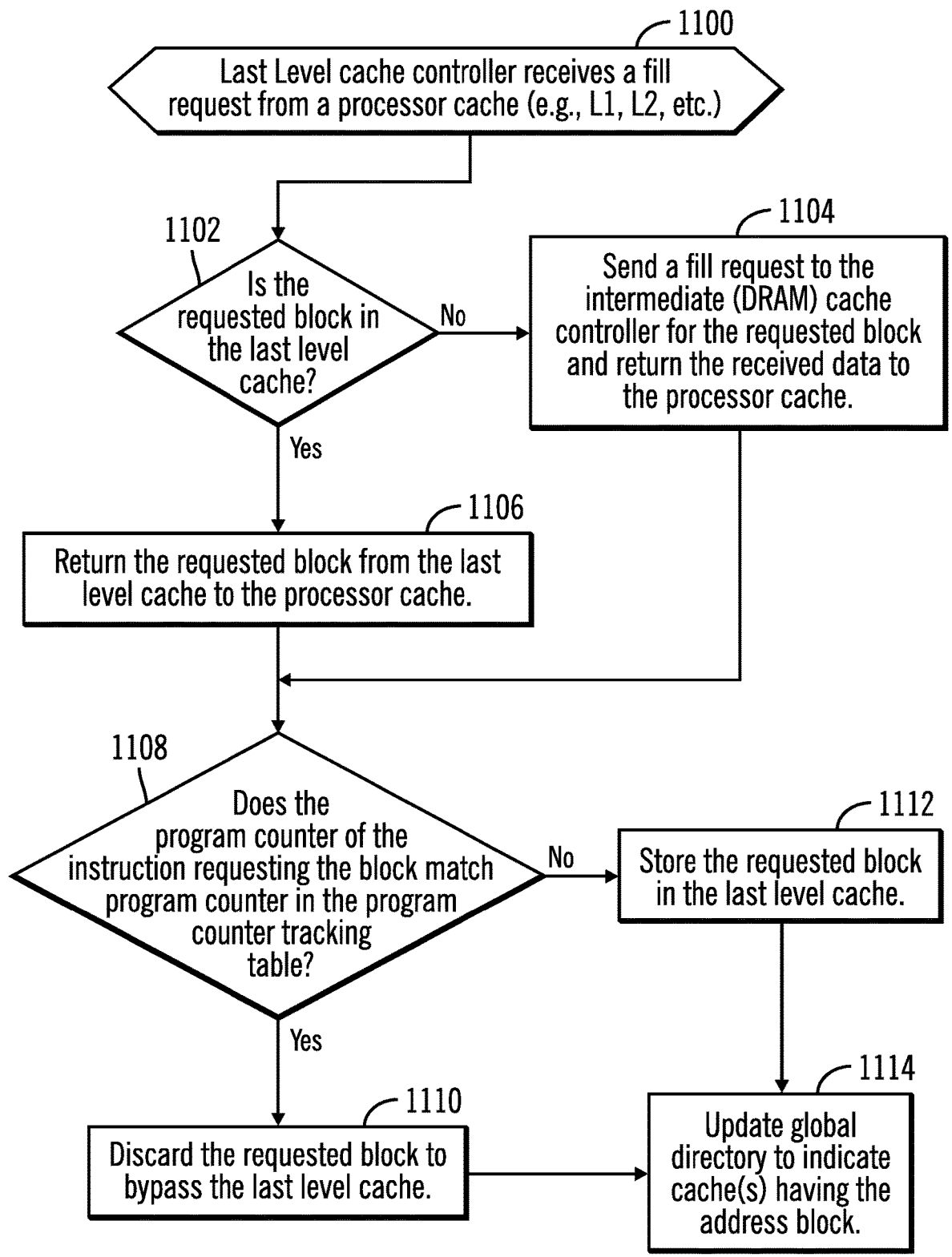
FIG. 11 illustrates an embodiment of operations for the last level cache to process a fill request from a processor cache using a program counter table for dead-block prediction.

FIG. 11 illustrates an embodiment of operations performed by the last level cache controller 422 to process a fill request for a processor L2 cache $414_i$ from an MMU $410_i$, using the program counter table 436 to handle likely dead-blocks. Upon receiving (at block 1100) a fill request from an MMU $410_i$, the last level cache controller 422 determines (at block 1102) whether the requested block address is in the last level cache 416. If not, a fill request is sent (at block 1104) to the intermediate cache controller 424 to retrieve the requested data. The intermediate cache controller 424 may then perform the operations in FIG. 10 to handle the fill request. If (at block 1102) the requested block address is in the last level cache 416, then the requested block is returned (at block 1106) from the last level cache 416 to the processor cache $414_i$. From block 1104 or 1106, if (at block 1108) the program counter of the instruction requesting the block matches a program counter in the program counter tracking table 436, then the last level cache controller 422 discards (at block 1110) the requested block to bypass the last level cache 416 because the block is likely to be a dead-block as the program counter of the instruction that previously requested the block address resulted in the block address being invalidated to provide ownership to a remote socket $402_R$. If (at block 1108) the program counter is not listed in the program counter tracking table 436, then the block for the requested block address is stored (at block 1112) in the last level cache 416. From block 1110 or 1112, the global directory 200 having the entry 200i for the requested block address may then be updated (at block 1114) to indicate the caches 208 now having a copy of the block addresses.

With the described embodiments of FIGS. 9-11, latency is reduced for read-for-ownership requests to the last level cache 416 from remote sockets $402_R$ because the program counter tracking table 436 provides a dead-block prediction by maintaining information on the instructions that requested a track that was invalidated in the intermediate cache 418. Instructions whose program counter is on the table 44 have a high likelihood of requesting further block addresses that will be invalidated by a remote socket 1028 seeking ownership of that block address. Thus, not maintaining the consumer-producer block address in the last level cache 416 requested by instructions having a program counter indicated in the table 446 avoids latency delays to the remote socket 1028 in obtaining ownership of the block address because the remote socket 1028 does not need to wait for the block addresses to be invalidated in the caches 416 and 418.

In one embodiment, the system 400 may include only the LLC tracking table 432 and not the intermediate cache tracking table 434 and program counter table 436, or include only the LLC tracking table 432 and the intermediate cache tracking table 434 and not the program counter table, 436, or include all three tracking tables 432, 434, 436.

Described embodiments are described with respect to providing hierarchical caching for processing nodes comprising sockets $102_1 \ldots 102_n$. In alternative embodiments, the caching system may be deployed for processing nodes other than sockets.

In described embodiments, cache coherence among the sockets is maintained using a directory based coherence where the sockets coordinate access with respect to a shared global directory. In an alternative embodiment, the sockets may use another coherence protocol, such as a snoopy coherence protocol where the sockets broadcast local DRAM cache misses to the other sockets to request access to blocks held at remote sockets and invalidate copies of the requested block in the private caches of the remote sockets.

Figure 12:
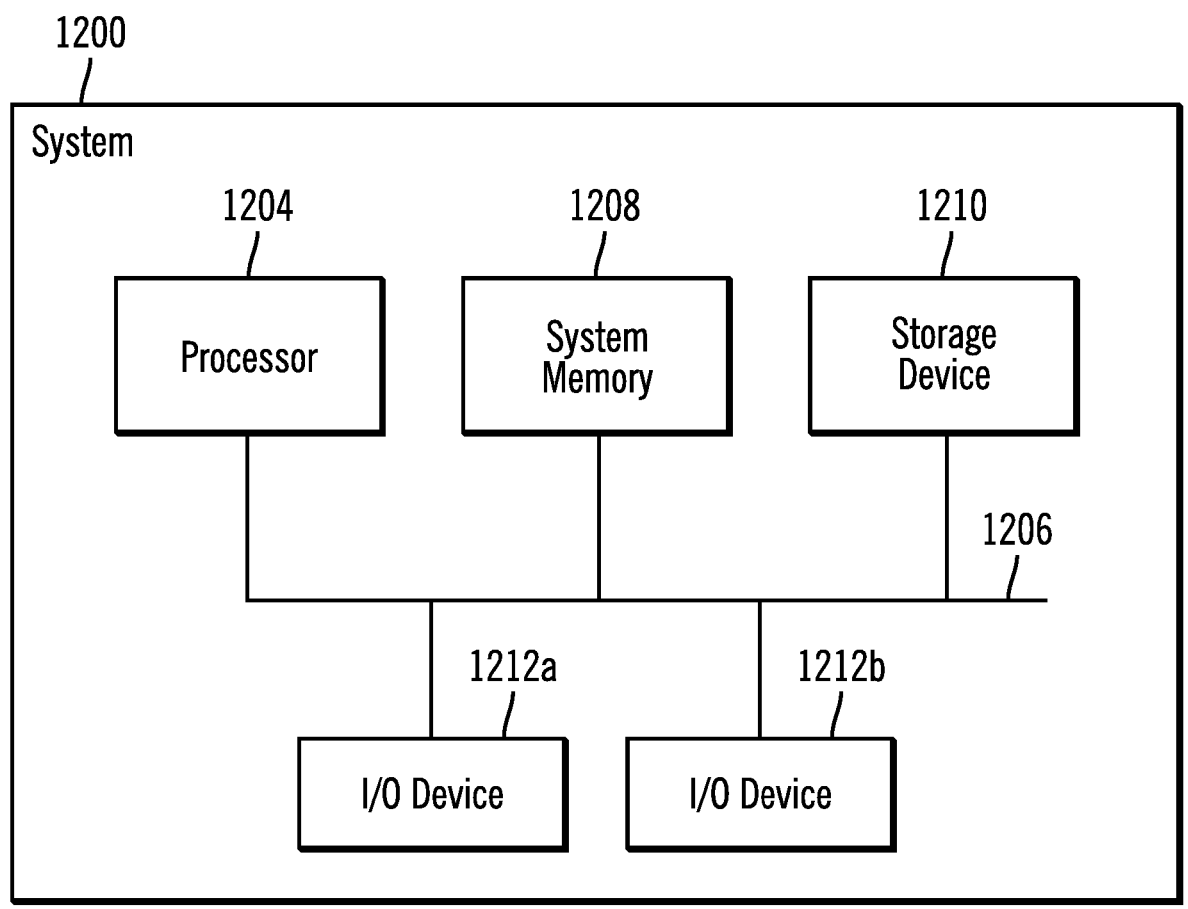
FIG. 12 illustrates a system in which the components of FIGS. 1 and 4 may be deployed.

FIG. 12 illustrates an embodiment of a system 1200 in which the systems 100 and 400 of FIGS. 1 and 4 may be deployed, where the processor 1204 comprises the sockets $102_i$, $402_i$ and the system memory 1208 comprises the combined shared memory 120, 420 on all the sockets. The system 600 may further include a storage device 1210 for long-term storage. The sockets may also communicate with Input/Output (I/O) devices 1212a, 1212b, which may comprise input devices, display devices, graphics cards, ports, network interfaces, etc.

It should be appreciated that reference throughout this specification to "one structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

Example 1 is an apparatus to cache data in a first cache and a second cache that cache data from a shared memory in a local processor node, wherein the shared memory is accessible to at least one remote processor node. A cache controller manages the first cache to: in response to evicting a block from the first cache, determine whether the block is more likely to be accessed by one of the at least one remote processor node than the local processor node; write the block to the second cache in response to determining that the block is more likely to be accessed by the local processor node than one of the at least one remote processor node; and write the block to the shared memory in response to determining that the block is more likely to be accessed by the one of the at least one remote processor node than the local processor node without writing to the second cache.

In Example 2, the subject matter of Examples 1 and 3-7 can optionally include that to determine whether the block is more likely to be accessed by one of the at least one remote processor node comprises: process a plurality of attributes related to the block to determine attribute values for the attributes; process a table indicating for each of the determined attribute values a confidence level indicating whether the block is more likely to be accessed by one of the at least one remote processor node than the local processor node; and determine whether an overall confidence level based on determined confidence levels for the determined attribute values exceed a confidence threshold. The block is written to the second cache in response to determining that the confidence level exceeds the confidence threshold and the block is written to the shared memory and not written to the second cache in response to determining that the confidence level does not exceed the confidence threshold.

In Example 3, the subject matter of Examples 1, 2, and 4-7 can optionally include that the cache controller is further to: in response to an invalidation request from one of the at least one remote processor node to invalidate a modified block having modified data, indicate an address of the modified block in a tracking table and write data for the modified block to the shared memory. To determine whether the block is more likely to be accessed by one of the at least one remote processor nodes determines whether the tracking table indicates the address of the modified block.

In Example 4, the subject matter of Examples 1-3 and 5-7 can optionally include that the cache controller comprises a first cache controller. The second cache is controlled by a second cache controller. To indicate the address of the modified block in the tracking table transmits the address of the modified block to the second cache controller to indicate in the tracking table.

In Example 5, the subject matter of Examples 1-4 and 6-7 can optionally include that the cache controller comprises a first cache controller. The second cache is controlled by a second cache controller and the shared memory is controlled by a shared memory controller. The second cache controller is further to: receive a fill request from the first cache controller in response to a read miss in the first cache for a requested block address; send a fill request to the shared memory for the requested block address in response to the requested block address not stored in the second cache; return data for the requested block address to the first cache controller from the second cache or from the fill request to the shared memory; determine whether the requested block address is in the tracking table; and store the data for the requested block address in the second cache in response to determining that the requested block address is not in the tracking table. The data for the requested block address is not stored in the second cache in response to determining that the requested block address is not indicated in the tracking table.

In Example 6, the subject matter of Examples 1-5 and 7 can optionally include that the first cache controller is further to: in response to an eviction request to evict a block address from the first cache, determine whether the block address in the tracking table; and write data for the block address to the second cache in response to determining that the block address is not in the tracking table. The data for the block address is not written to the second cache in response to determining that the block address is in the tracking table.

In Example 7, the subject matter of Examples 1-6 can optionally include that the first cache controller is further to: in response to a write-back for modified data for a block address from the first cache, determine whether the block address is in the tracking table; write the modified data to the second cache in response to determining that the block address for the modified data is not in the tracking table; and write the modified data to the shared memory bypassing the second cache in response to determining that the block address for the modified data is in the tracking table.

Example 8 is an apparatus to cache data in a first cache and a second cache that cache data from a shared memory in a local processor node. The first cache caches data for a processor cache at the local processor node and the shared memory is accessible to at least one remote processor node. A first cache controller manages the first cache. A second cache controller managing the second cache to: in response to an invalidation request from one of the at least one remote processor node to invalidate a block, indicate an address of the block to invalidate in an intermediate cache tracking table; in response to a first cache fill request for a requested block from the first cache controller, determine whether an address of the requested block is in the intermediate cache tracking table; and notify the first cache controller to track a program counter of a requesting instruction requesting the requested block. The first cache controller indicates the program counter of the requesting instruction in a tracked program counter table to use to determine whether to store data in the first cache and the second cache in response to a fill request for the processor cache.

In Example 9, the subject matter of Examples 8 and 10 can optionally include that the requested block comprises a first requested block, the address comprises a first address, and the requesting instruction comprises a first requesting instruction. The first cache controller is further to: receive a fill request for a second requested block at a second address for the processor cache for a second requesting instruction; determine whether a program counter of the second requesting instruction is indicated in the tracked program counter table; return data for the second requested block to the processor cache in response to the fill request for the second requested block; and use the tracked program counter table to determine whether to cache the data for the second requested block in the first cache.

In Example 10, the subject matter of Examples 8 and 9 can optionally include that to use the tracked program counter table to determine whether to cache the data for the second requested block in the first cache and the second cache is to: cache the data for the second requested block in the first cache and the second cache in response to determining that the program counter of the second requesting instruction is not indicated in the tracked program counter table. The data for the second requested block is not cached in the first and the second caches in response to determining that the program counter of the second requesting instruction is indicated in the tracked program counter table.

Example 11 is a system comprising a plurality of sockets that communicate over an interface. Each socket of the sockets includes at least one local processing core, a shared memory accessible to the sockets, a first cache, a second cache, and a first cache controller managing the first cache. The first cache controller is to: in response to evicting a block from the first cache, determine whether the block is more likely to be accessed by at least one remote socket comprising another of the sockets than the at least one local processor core; write the block to the second cache in response to determining that the block is more likely to be accessed by the at least one local processor core than the at least one remote socket; and write the block to the shared memory in response to determining that the block is more likely to be accessed by the at least one remote socket than the local processor core without writing to the second cache.

In Example 12, the subject matter of Examples 11 and 13-17 can optionally include that to determine whether the block is more likely to be accessed by one of the at least one remote socket comprises: process a plurality of attributes related to the block to determine attribute values for the attributes; process a table indicating for each of the determined attribute values a confidence level indicating whether the block is more likely to be accessed by the at least one remote socket than the at least one local processor core; and determine whether an overall confidence level based on determined confidence levels for the determined attribute values exceed a confidence threshold. The block is written to the second cache in response to determining that the confidence level exceeds the confidence threshold and wherein the block is written to the shared memory and not written to the second cache in response to determining that the confidence level does not exceed the confidence threshold.

In Example 13, the subject matter of Examples 11, 12 and 14-17 can optionally include that the first cache controller is further to: in response to an invalidation request from one of the at least remote socket to invalidate a modified block having modified data, indicate an address of the modified block in a tracking table and write data for the modified block to the shared memory. To determine whether the block is more likely to be accessed by the at least one remote socket determines whether the tracking table indicates the address of the modified block.

In Example 14, the subject matter of Examples 11-13 and 15-17 can optionally include that the second cache is controlled by a second cache controller. To indicate the address of the modified block in the tracking table transmits the address of the modified block to the second cache controller to indicate in the tracking table.

In Example 15, the subject matter of Examples 11-14 and 16-17 can optionally include that each socket further includes a second cache controller to control the second cache and a shared memory controller to control the shared memory. The second cache controller is further to: receive a fill request from the first cache controller in response to a read miss in the first cache for a requested block address; send a fill request to the shared memory for the requested block address in response to the requested block address not stored in the second cache; return data for the requested block address to the first cache controller from the second cache or from the fill request to the shared memory; determine whether the requested block address is in the tracking table; and store the data for the requested block address in the second cache in response to determining that the requested block address is not in the tracking table. The data for the requested block address is not stored in the second cache in response to determining that the requested block address is not indicated in the tracking table.

In Example 16, the subject matter of Examples 11-15 and 17 can optionally include that the first cache controller is further to: in response to an eviction request to evict a block address from the first cache, determine whether the block address in the tracking table; and write data for the block address to the second cache in response to determining that the block address is not in the tracking table. The data for the block address is not written to the second cache in response to determining that the block address is in the tracking table.

In Example 17, the subject matter of Examples 11-16 can optionally include that the first cache controller is further to: in response to a writeback for modified data for a block address from the first cache, determine whether the block address is in the tracking table; write the modified data to toe second cache in response to determining that the block address for the modified data is not in the tracking table; and write the modified data to the shared memory bypassing the second cache in response to determining that the block address for the modified data is in the tracking table.

Example 18 is a system comprising a plurality of sockets that communicate over an interface. Each socket of the sockets includes: at least one local processing core; a shared memory accessible to the sockets; a first cache; a second cache; a first cache controller managing the first cache; and a second cache controller managing the second cache. The second cache controller is to: in response to an invalidation request from one of the at least one remote socket to invalidate a block, indicate an address of the block to invalidate in an intermediate cache tracking table; in response to a first cache fill request for a requested block from the first cache controller, determine whether an address of the requested block is in the intermediate cache tracking table; and notify the first cache controller to track a program counter of a requesting instruction requesting the requested block. The first cache controller indicates the program counter of the requesting instruction in a tracked program counter table to use to determine whether to store data in the first cache and the second cache in response to a fill request for the processor cache.

In Example 19, the subject matter of Examples 18 and 20 can optionally include that the requested block comprises a first requested block, the address comprises a first address, and wherein the requesting instruction comprises a first requesting instruction. The first cache controller is further to: receive a fill request for a second requested block at a second address for the processor cache for a second requesting instruction; determine whether a program counter of the second requesting instruction is indicated in the tracked program counter table; return data for the second requested block to the processor cache in response to the fill request for the second requested block; and use the tracked program counter table to determine whether to cache the data for the second requested block in the first cache.

In Example 20, the subject matter of Examples 18 and 19 can optionally include that to use the tracked program counter table to determine whether to cache the data for the second requested block in the first cache and the second cache is to cache the data for the second requested block in the first cache and the second cache in response to determining that the program counter of the second requesting instruction is not indicated in the tracked program counter table. The data for the second requested block is not cached in the first and the second caches in response to determining that the program counter of the second requesting instruction is indicated in the tracked program counter table.

An apparatus comprising means to perform a method as claimed in any preceding claim.

Machine-readable storage including machine-readable instructions, when executed, to implement a method or realize an apparatus as claimed in any preceding claim.

What is claimed:

1. An apparatus to cache data in a first cache and a second cache that cache data from a shared memory in a local processor node, wherein the shared memory is accessible to at least one remote processor node, comprising:
   a cache controller managing the first cache to:
      in response to evicting a block from the first cache, determine whether the block is more likely to be accessed by one of the at least one remote processor node than the local processor node;
      write the block to the second cache in response to determining that the block is more likely to be accessed by the local processor node than one of the at least one remote processor node; and
      write the block to the shared memory in response to determining that the block is more likely to be accessed by the one of the at least one remote processor node than the local processor node without writing to the second cache.

2. The apparatus of claim 1, wherein to determine whether the block is more likely to be accessed by one of the at least one remote processor node comprises:
   process a plurality of attributes related to the block to determine attribute values for the attributes;
   process a table indicating for each of the determined attribute values a confidence level indicating whether the block is more likely to be accessed by one of the at least one remote processor node than the local processor node; and determine whether an overall confidence level based on determined confidence levels for the determined attribute values exceed a confidence threshold, wherein the block is written to the second cache in response to determining that the confidence level exceeds the confidence threshold and wherein the block is written to the shared memory and not written to the second cache in response to determining that the confidence level does not exceed the confidence threshold.

3. The apparatus of claim 1, wherein the cache controller is further to:

in response to an invalidation request from one of the at least one remote processor node to invalidate a modified block having modified data, indicate an address of the modified block in a tracking table and write data for the modified block to the shared memory, wherein to determine whether the block is more likely to be accessed by one of the at least one remote processor node is to determine whether the tracking table indicates the address of the modified block.

4. The apparatus of claim 3, wherein the cache controller comprises a first cache controller, wherein the second cache is controlled by a second cache controller, wherein to indicate the address of the modified block in the tracking table transmits the address of the modified block to the second cache controller to indicate in the tracking table.

5. The apparatus of claim 3, wherein the cache controller comprises a first cache controller, wherein the second cache is controlled by a second cache controller and wherein the shared memory is controlled by a shared memory controller, wherein the second cache controller is further to:

receive a fill request from the first cache controller in response to a read miss in the first cache for a requested block address;

send a fill request to the shared memory for the requested block address in response to the requested block address not stored in the second cache;

return data for the requested block address to the first cache controller from the second cache or from the fill request to the shared memory;

determine whether the requested block address is in the tracking table; and store the data for the requested block address in the second cache in response to determining that the requested block address is not in the tracking table, wherein the data for the requested block address is not stored in the second cache in response to determining that the requested block address is not indicated in the tracking table.

6. The apparatus of claim 3, wherein the cache controller is further to:

in response to an eviction request to evict a block address from the first cache, determine whether the block address is in the tracking table; and write data for the block address to the second cache in response to determining that the block address is not in the tracking table, wherein the data for the block address is not written to the second cache in response to determining that the block address is in the tracking table.

7. The apparatus of claim 3, wherein the cache controller is further to:

in response to a write-back for modified data for a block address from the first cache, determine whether the block address is in the tracking table;

write the modified data to the second cache in response to determining that the block address for the modified data is not in the tracking table; and write the modified data to the shared memory bypassing the second cache in response to determining that the block address for the modified data is in the tracking table.

8. An apparatus to cache data in a first cache and a second cache that cache data from a shared memory in a local processor node, and wherein the first cache caches data for a processor cache at the local processor node, wherein the shared memory is accessible to at least one remote processor node, comprising:

a first cache controller managing the first cache; and a second cache controller managing the second cache to:

in response to an invalidation request from one of the at least one remote processor node to invalidate a block, indicate an address of the block to invalidate in a second cache tracking table to track addresses invalidated in the second cache;

in response to a first cache fill request for a requested block from the first cache controller, determine whether an address of the requested block is in the second cache tracking table; and notify the first cache controller to track a program counter of a requesting instruction requesting the requested block, wherein the first cache controller indicates the program counter of the requesting instruction in a tracked program counter table to use to determine whether the first cache controller stores a requested block from a fill request from a processor cache in the first cache or discards the requested block to bypass the first cache.

9. The apparatus of claim 8, wherein the requested block comprises a first requested block, the address comprises a first address, and wherein the requesting instruction comprises a first requesting instruction, wherein the first cache controller is further to:

receive a fill request for a second requested block at a second address for the processor cache for a second requesting instruction;

determine whether a program counter of the second requesting instruction is indicated in the tracked program counter table;

return data for the second requested block to the processor cache in response to the fill request for the second requested block; and use the tracked program counter table to determine whether to cache for the second requested block in the first cache.

10. The apparatus of claim 9, wherein to use the tracked program counter table to determine whether to cache the data for the second requested block in the first cache and the second cache is to:

cache the data for the second requested block in the first cache and the second cache in response to determining that the program counter of the second requesting instruction is not indicated in the tracked program counter table, wherein the data for the second requested block is not cached in the first and the second caches in response to determining that the program counter of the second requesting instruction is indicated in the tracked program counter table.

11. A system, comprising
a plurality of sockets that communicate over an interface, wherein each socket of the sockets includes:
at least one local processor core;
a shared memory accessible to at least one remote socket;
a first cache;
a second cache;
a first cache controller managing the first cache to:
  in response to evicting a block from the first cache, determine whether the block is more likely to be accessed by at least one remote socket comprising another of the sockets than the at least one local processor core;
  write the block to the second cache in response to determining that the block is more likely to be accessed by the at least one local processor core than the at least one remote socket; and
  write the block to the shared memory in response to determining that the block is more likely to be accessed by the at least one remote socket than the at least one local processor core without writing to the second cache.

12. The system of claim 11, wherein to determine whether the block is more likely to be accessed by one of the at least one remote socket comprises:
  process a plurality of attributes related to the block to determine attribute values for the attributes;
  process a table indicating for each of the determined attribute values a confidence level indicating whether the block is more likely to be accessed by the at least one remote socket than the at least one local processor core; and
  determine whether an overall confidence level based on determined confidence levels for the determined attribute values exceed a confidence threshold, wherein the block is written to the second cache in response to determining that the confidence level exceeds the confidence threshold and wherein the block is written to the shared memory and not written to the second cache in response to determining that the confidence level does not exceed the confidence threshold.

13. The system of claim 11, wherein the first cache controller is further to:
  in response to an invalidation request from one of the at least one remote socket to invalidate a modified block having modified data, indicate an address of the modified block in a tracking table and write data for the modified block to the shared memory, wherein to determine whether the block is more likely to be accessed by the at least one remote socket is to determine whether the tracking table indicates the address of the modified block.

14. The system of claim 13, wherein the second cache is controlled by a second cache controller, wherein to indicate the address of the modified block in the tracking table transmits the address of the modified block to the second cache controller to indicate in the tracking table.

15. The system of claim 13, wherein each socket further includes a second cache controller to control the second cache and a shared memory controller to control the shared memory, wherein the second cache controller is further to:
  receive a fill request from the first cache controller in response to a read miss in the first cache for a requested block address;
  send a fill request to the shared memory for the requested block address in response to the requested block address not stored in the second cache;
  return data for the requested block address to the first cache controller from the second cache or from the fill request to the shared memory;
  determine whether the requested block address is in the tracking table; and
  store the data for the requested block address in the second cache in response to determining that the requested block address is not in the tracking table, wherein the data for the requested block address is not stored in the second cache in response to determining that the requested block address is not indicated in the tracking table.

16. The system of claim 13, wherein the first cache controller is further to:
  in response to an eviction request to evict a block address from the first cache, determine whether the block address is in the tracking table; and
  write data for the block address to the second cache in response to determining that the block address is not in the tracking table, wherein the data for the block address is not written to the second cache in response to determining that the block address is in the tracking table.

17. The system of claim 13, wherein the first cache controller is further to:
  in response to a writeback for modified data for a block address from the first cache, determine whether the block address is in the tracking table;
  write the modified data to the second cache in response to determining that the block address for the modified data is not in the tracking table; and
  write the modified data to the shared memory bypassing the second cache in response to determining that the block address for the modified data is in the tracking table.

18. A system, comprising:
a plurality of sockets that communicate over an interface, wherein each socket of the sockets includes:
at least one local processing core;
a shared memory accessible to at least one remote socket;
a first cache;
a second cache;
a first cache controller managing the first cache; and
a second cache controller managing the second cache to:
  in response to an invalidation request from one of the at least one remote socket to invalidate a block, indicate an address of the block to invalidate in an intermediate cache tracking table;
  in response to a first cache fill request for a requested block from the first cache controller, determine whether an address of the requested block is in a second cache tracking table to track addresses invalidated in the second cache; and
  notify the first cache controller to track a program counter of a requesting instruction requesting the requested block, wherein the first cache controller indicates the program counter of the requesting instruction in a tracked program counter table to use to determine whether the first cache controller stores a requested block from a fill request from a processor cache in the first cache or discards the requested block to bypass the first cache.

19. The system of claim 18, wherein the requested block comprises a first requested block, the address comprises a first address, and wherein the requesting instruction comprises a first requesting instruction, wherein the first cache controller is further to:

receive a fill request for a second requested block at a second address for the processor cache for a second requesting instruction;

determine whether a program counter of the second requesting instruction is indicated in the tracked program counter table;

return data for the second requested block to the processor cache in response to the fill request for the second requested block; and use the tracked program counter table to determine whether to cache the data for the second requested block in the first cache.

20. The system of claim 19, wherein to use the tracked program counter table to determine whether to cache the data for the second requested block in the first cache and the second cache is to:

cache the data for the second requested block in the first cache and the second cache in response to determining that the program counter of the second requesting instruction is not indicated in the tracked program counter table, wherein the data for the second requested block is not cached in the first and the second caches in response to determining that the program counter of the second requesting instruction is indicated in the tracked program counter table.

* * * * *